United States Patent
Kilper

(10) Patent No.: US 9,067,740 B2
(45) Date of Patent: Jun. 30, 2015

(54) REMOTELY DRIVEN SHUTTLE CAR

(71) Applicant: Intelligrated Headquarters, LLC, Mason, OH (US)

(72) Inventor: John J. Kilper, St. Peters, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 13/844,398

(22) Filed: Mar. 15, 2013

(65) Prior Publication Data

US 2014/0262687 A1    Sep. 18, 2014

(51) Int. Cl.
*B65G 35/00* (2006.01)
*B66F 9/07* (2006.01)
*B65G 1/04* (2006.01)

(52) U.S. Cl.
CPC . *B65G 35/00* (2013.01); *B66F 9/07* (2013.01); *B65G 1/0492* (2013.01)

(58) Field of Classification Search
CPC .............................. B65G 17/02; B65G 1/0492
USPC ........................................ 414/277, 278, 279
See application file for complete search history.

(56) References Cited

U.S. PATENT DOCUMENTS

| | | | |
|---|---|---|---|
| 4,175,656 A | 11/1979 | Lang | |
| 4,974,439 A | 12/1990 | Saunders et al. | |
| 5,324,158 A * | 6/1994 | Shah et al. | 414/294 |
| 5,551,552 A | 9/1996 | Ophardt et al. | |
| 5,996,771 A * | 12/1999 | Estes | 198/686 |
| 6,234,737 B1 * | 5/2001 | Young et al. | 414/277 |
| 6,446,782 B1 | 9/2002 | Patrick | |
| 6,669,005 B2 * | 12/2003 | Sandberg et al. | 198/460.2 |
| 7,686,560 B2 * | 3/2010 | Laurin et al. | 414/278 |
| 2006/0070847 A1 | 4/2006 | Besch et al. | |
| 2006/0280580 A1 * | 12/2006 | Lutz | 414/222.03 |
| 2011/0008138 A1 * | 1/2011 | Yamashita | 414/277 |
| 2011/0262253 A1 * | 10/2011 | Krizmanic et al. | 414/279 |
| 2011/0309102 A1 * | 12/2011 | Becker et al. | 222/1 |
| 2012/0099953 A1 * | 4/2012 | Hortig et al. | 414/279 |
| 2012/0216490 A1 * | 8/2012 | Cooper et al. | 53/447 |

OTHER PUBLICATIONS

International Search Report and Written Opinion dated Jul. 2, 2014 for Application No. PCT/US2014/027390.

* cited by examiner

*Primary Examiner* — Gene Crawford
*Assistant Examiner* — Thomas Randazzo
(74) *Attorney, Agent, or Firm* — Frost Brown Todd LLC

(57) ABSTRACT

A shuttle system includes a shuttle which has no onboard power to drive the shuttle nor to drive a conveyor carried by said shuttle. The shuttle is moved by a first drive element which is driven by a remotely located mechanical power source. The conveyor is connected to a second drive element and is selectively actuated driving said second drive element such that there is a speed difference between the second drive element and the first drive element.

11 Claims, 17 Drawing Sheets

REMOTELY DRIVEN SHUTTLE CAR

BACKGROUND

The present disclosure relates generally to material handling systems, and is more particularly directed to a guided shuttle which does not require electric power at the shuttle for to move from a first location to a second location. The innovation will be disclosed in connection with, but not necessarily limited to, a shuttle which is moved between first and second locations by mechanical power from a remotely located mechanical power source. The shuttle includes at least one conveyor which is driven by a remotely located mechanical power source.

BRIEF DESCRIPTION OF THE DRAWINGS

The accompanying drawings illustrate embodiments of the invention, and, together with specification, including the detailed description which follows, serve to explain the principles of the present invention.

Figure 1:
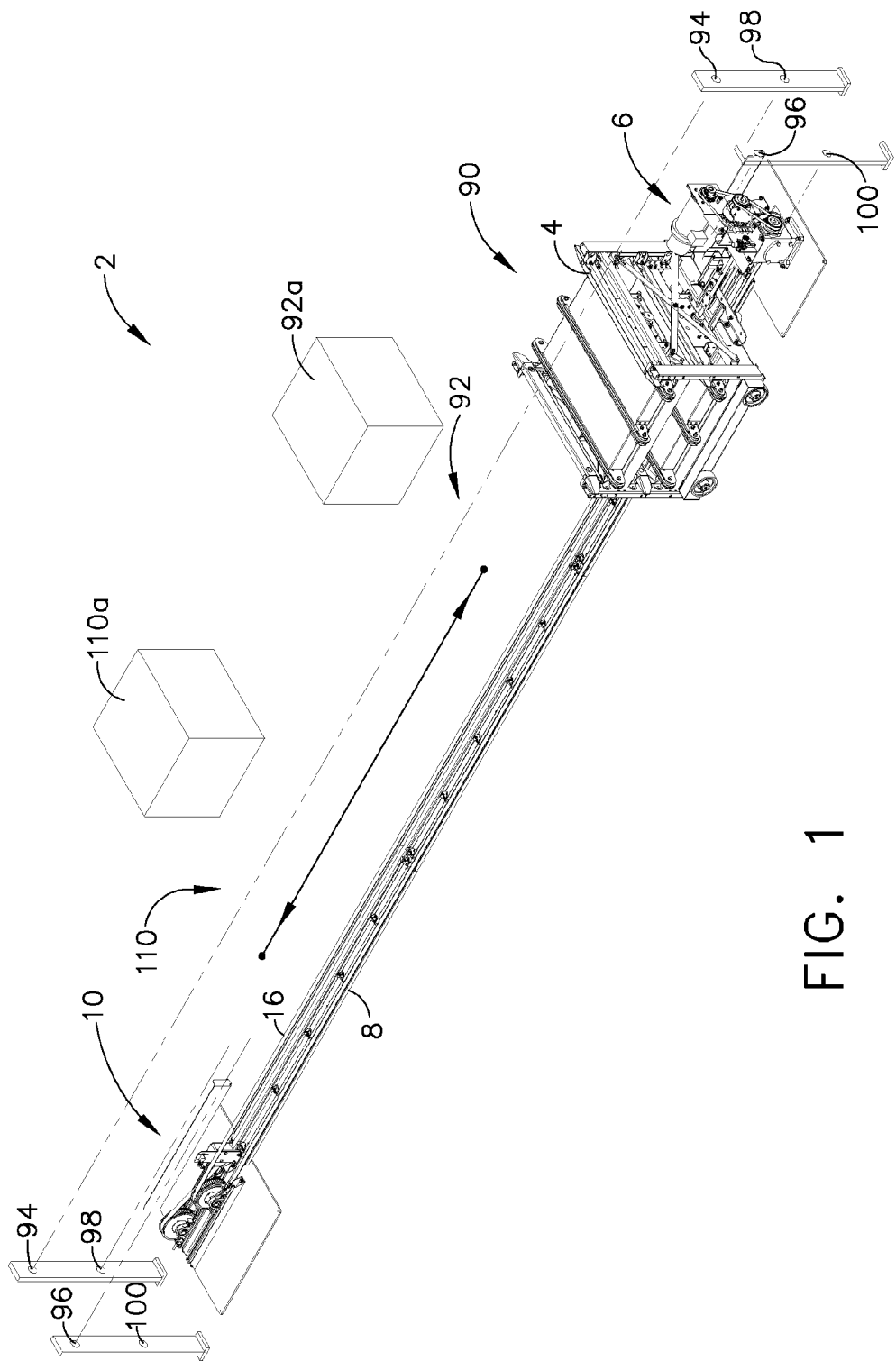
FIG. 1 is a perspective view a shuttle system constructed in accordance with the teachings of the present invention.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Figure 3:
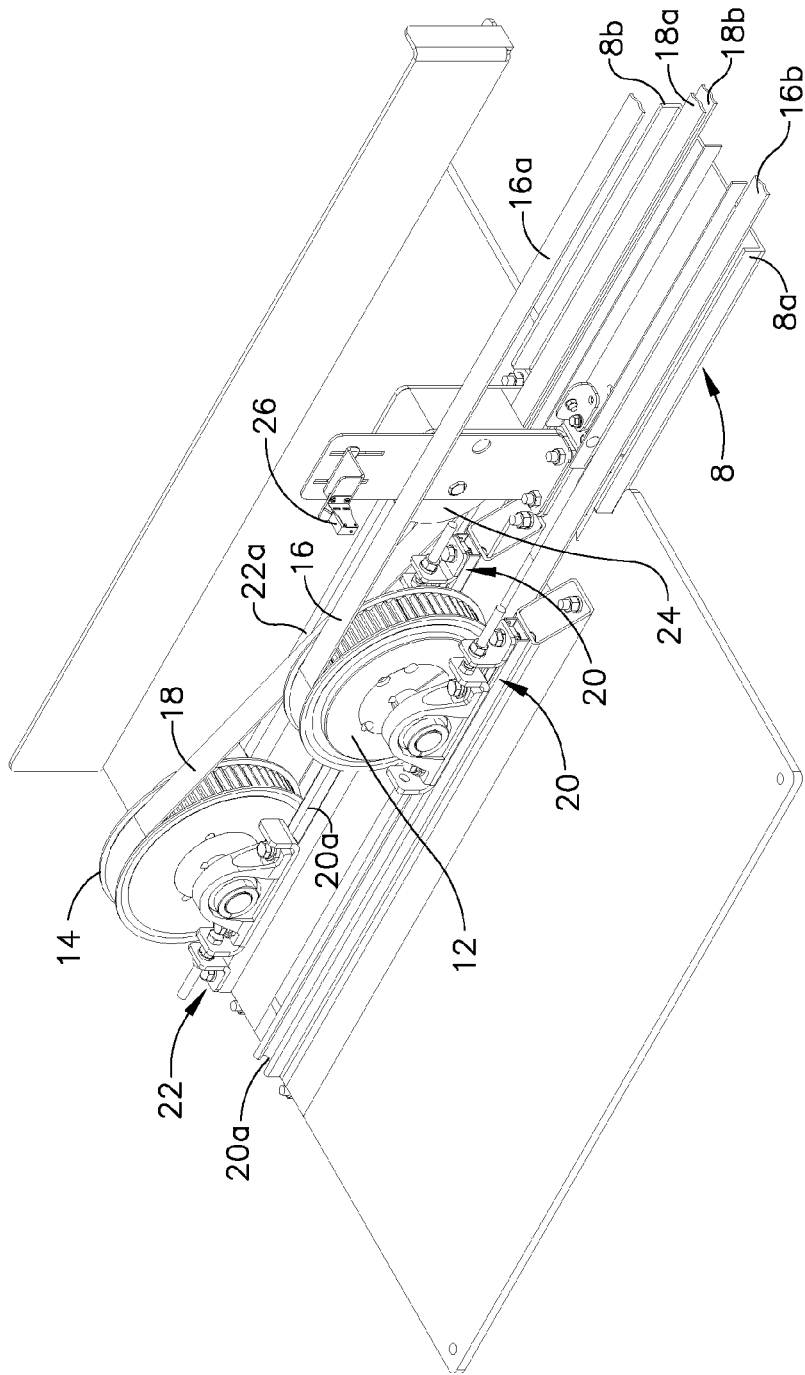
FIG. 3 is a perspective view of idler end of the mechanical power transmission system of the shuttle system of FIG. 1.

Referring to FIG. 1, shuttle system 2 comprises shuttle 4 disposed proximal mechanical power assembly 6, guide track 8 and idler end 10. Referring also to FIG. 3, idler end 10 includes first idler 12 and second idler 14. Shuttle drive element 16, disposed about idler 12, includes upper run 16a and lower run 16b. Similarly, transfer drive belt 18, disposed about idler 14, includes upper run 18a and lower run 18b. To maintain the desired tension in each drive belt 16 and 18, each idler 12, 14 is adjustable in a direction parallel to drive belts 16 and 18. Adjustment mechanism 20 may be used to locate idler 12 longitudinally along tracks 20a, and adjustment mechanism 22 may be used to locate idler 14 longitudinally along track 20a and track 22a. Guide track 8 includes channel 8a which guides lower run 16b and channel 8b which guides upper run 18a and lower run 18b. Upper run 18a is maintained adjacent lower run 18b as illustrated by roller 24.

As seen in FIG. 3, proximity sensor 26 is disposed proximal upper run 16a. Proximity sensor 26 detects the presence of shuttle drive belt 16. If upper run 16a is not sensed, such as if shuttle drive belt 16 broke or became slack, shuttle system 2 would shut down.

Figure 2:
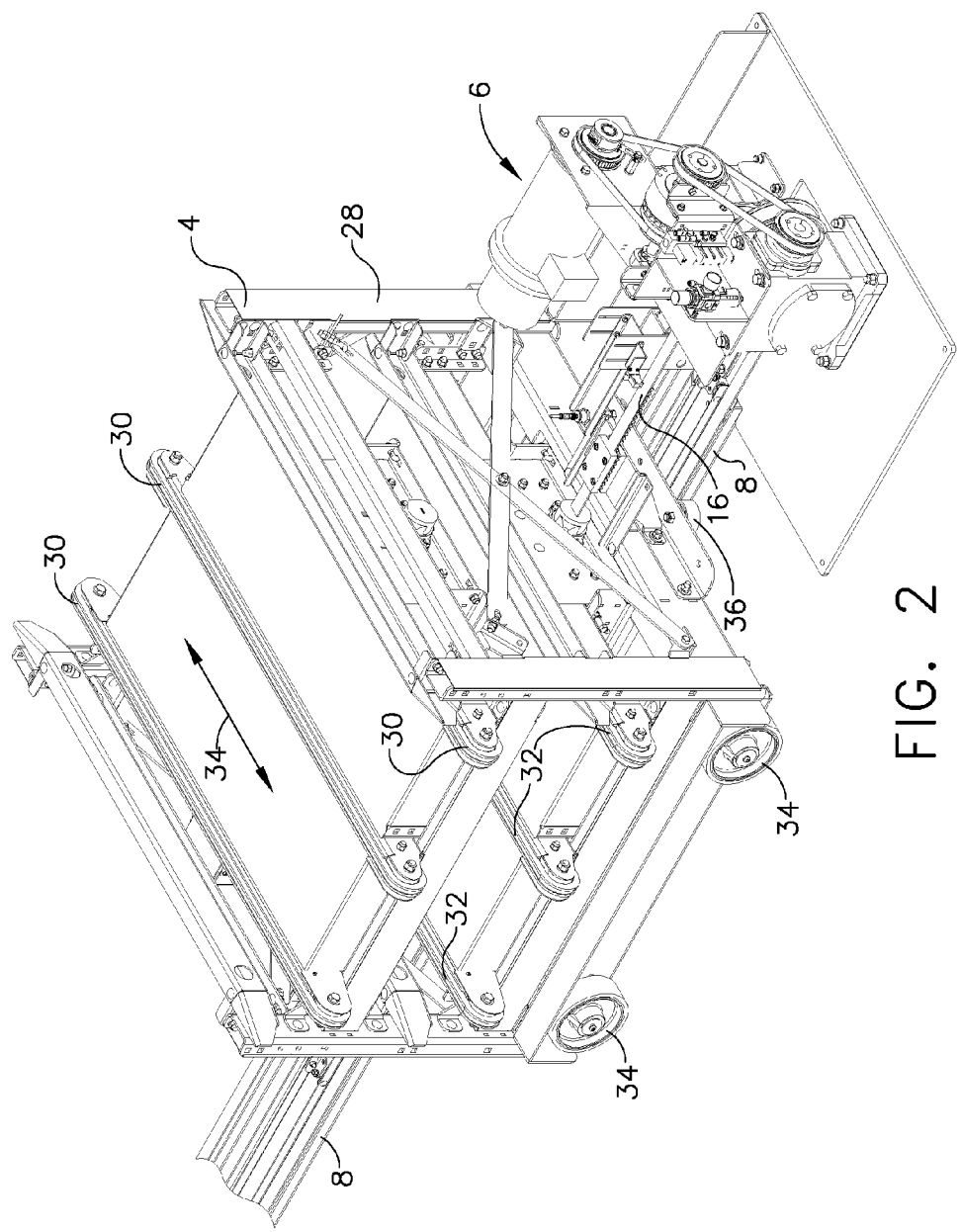
FIG. 2 is a perspective view of the shuttle and remotely located mechanical power source of the shuttle system of FIG. 1.

Referring to FIG. 2, shuttle 4 has frame 28 which supports upper conveyors 30 and lower conveyors 32. Upper conveyors 30 and lower conveyors 32 are configured to be driven in either transverse direction, parallel to arrow 34. Upper conveyors 30 and lower conveyors 32 may be of any suitable configuration for the articles which will be transferred and carried thereby. In the embodiment depicted, upper conveyors 30 and lower conveyors 32 are chains suitable for transferring and supporting pallets. Upper conveyors 30 have vertical space to carry loaded pallets, while lower conveyors 32 have only enough vertical space for empty pallets. Shuttle 4 includes wheels 34 which support shuttle 4 for longitudinal movement. Shuttle 4 also includes a plurality of track guides 36, illustrated as wheels rotatable about vertical axes, which are disposed adjacent the outside of track 8 at either end of shuttle 4 (only one is visible in FIG. 2). Guides 36 constrain shuttle 4 to follow track 8.

Shuttle 4 is not limited to the size, shape and configuration illustrated. It may be any size, shape and configuration compatible with the delivery of mechanical power from a remotely located mechanical power source as described herein. Remote mechanical power source and remotely located mechanical power source as used herein and in the claims refers to such source not being located on shuttle 4. Any suitable shuttle drive element may be used, it is not required that it be a belt 16 as discussed herein. Any suitable drive element which can connect shuttle 4 to remotely located mechanical power source may be used.

Figure 4:
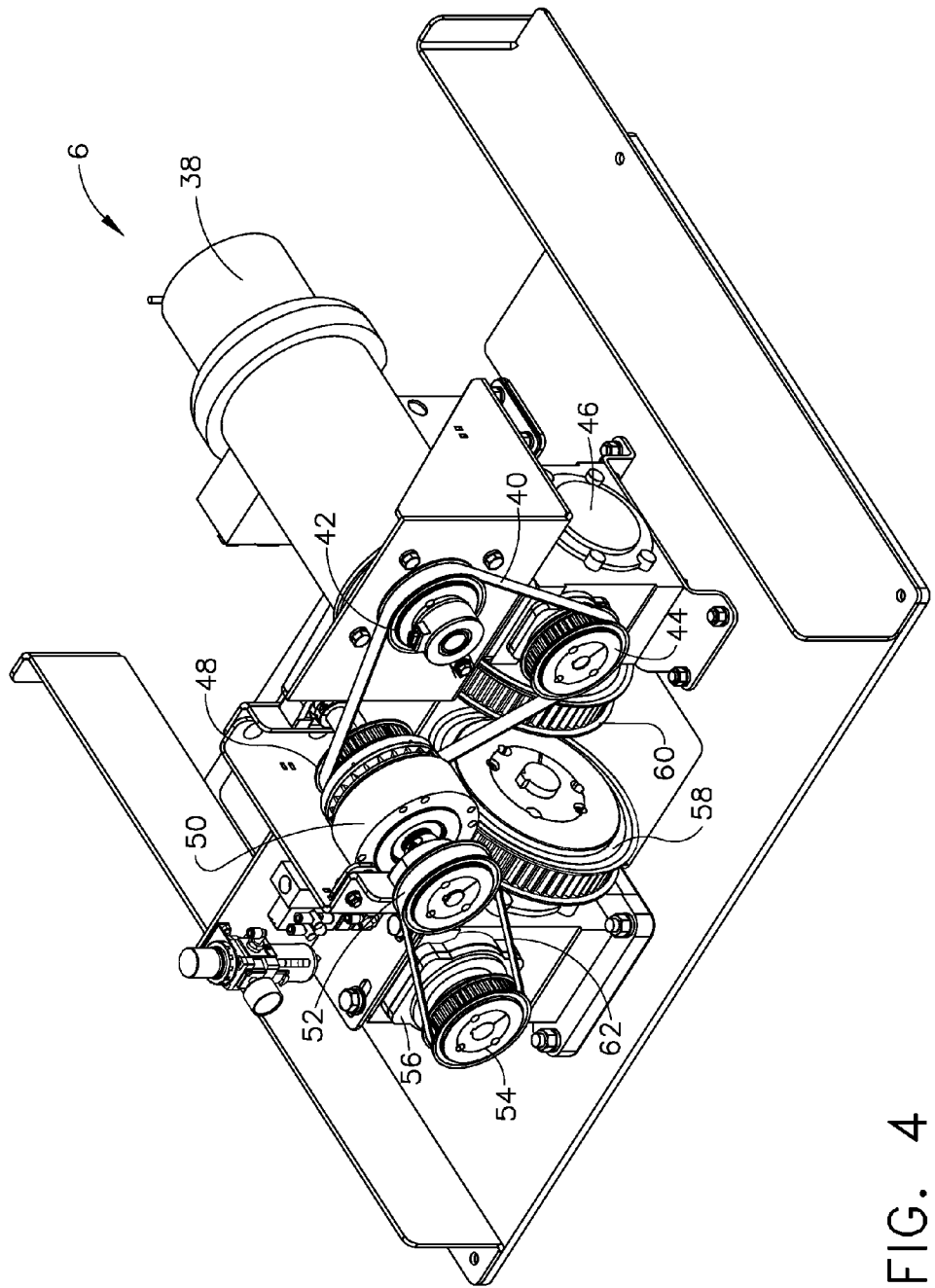
FIG. 4 is a perspective view of the mechanical power transmission system of the shuttle system of FIG. 1.

Referring to FIG. 4, mechanical power assembly 6 includes a source of rotational power, which is depicted as electric motor 38. Any suitable source of rotational power may be used, including for example, a pneumatic motor. Motor 38 is configured to provide rotational motion and power through drive belt 40, driven by output pulley 42. Drive belt 40 engages and drives input drive pulley 44 of transmission 46 and also drives input drive pulley 48 of clutch/brake 50. Output 52 of clutch/brake 50 engages and drives input drive pulley 54 of transmission 56.

The output of transmission 56 drives shuttle drive pulley 58, which is engaged by shuttle drive belt 16 (omitted for clarity). The output of transmission 46 drives transfer drive pulley 60. As described below, operation of upper conveyors 30 and lower conveyors 32 results depends on relative motion between shuttle 4 and transfer drive belt 18. Thus, the ability to synchronize the rotation of shuttle drive pulley 58 and transfer drive pulley 60 is necessary to be able to control when and how upper conveyors 30 and lower conveyors 32 operate. This requires synchronized rotation of components in the drive train of shuttle drive pulley 58 with the rotation of components in the drive train of transfer drive pulley 30.

This is achieved in the embodiment depicted by transmissions 46 and 56 having the same input/output drive ratios and driving input pulleys 44, 54 at the same speed. With clutch/brake 50 in the drive train of drive pulley 58, a simple approach may be utilized: Input drive pulley 48 is configured the same as input drive pulley 44 so that there is no rotation speed difference therebetween. To ensure this, input drive pulleys 44 and 48 may be toothed, and the drive belt 40 may have teeth on its interior surface mating with input drive pulleys 44 and 48. When input pulley 48 is coupled to output drive pulley 52 through clutch/brake 50, it is a 1:1 drive. Similarly, output drive pulley 52 is configured the same as input pulley 54 so that there is no speed difference therebetween. To ensure this, output drive pulley 52 and input pulley 54 may be toothed and drive belt 62 may have teeth on its inner surface.

It is noted that any suitable arrangement to maintain control of and synchronize the speed of shuttle drive belt 16 and transfer drive belt 18. For example two motors with adequately precise control thereof may be used.

FIGS. 5-9 provide additional view of the described components. Roller 64 maintains upper run 18*a* proximal lower run 18*b*. Upper run 16*a* of shuttle drive belt is attached to shuttle 4 by coupling 64*a* and 64*b*, which securely clamp the respective ends of upper runs 16*a*. Shuttle drive belt 16 is a continuous belt from clamp 64*a* to clamp 64*b*, with lower run 16*b* running underneath shuttle 4 in channel 8*a* between pulley 58 and idler 12. Alternatively, shuttle drive belt 16 could be a continuous loop, secured to shuttle in any suitable manner so that shuttle drive belt 16 and shuttle 4 have no relative movement therebetween, which is required for shuttle drive belt 16 to drive shuttle 4. Shuttle drive belt 16 may also be disposed such that upper run 16*a* is adjacent lower run 16*b*. Shuttle drive belt 16 may include teeth 16*t* extending from its interior surface, which positively engage teeth on shuttle drive pulley 58.

Figure 5:
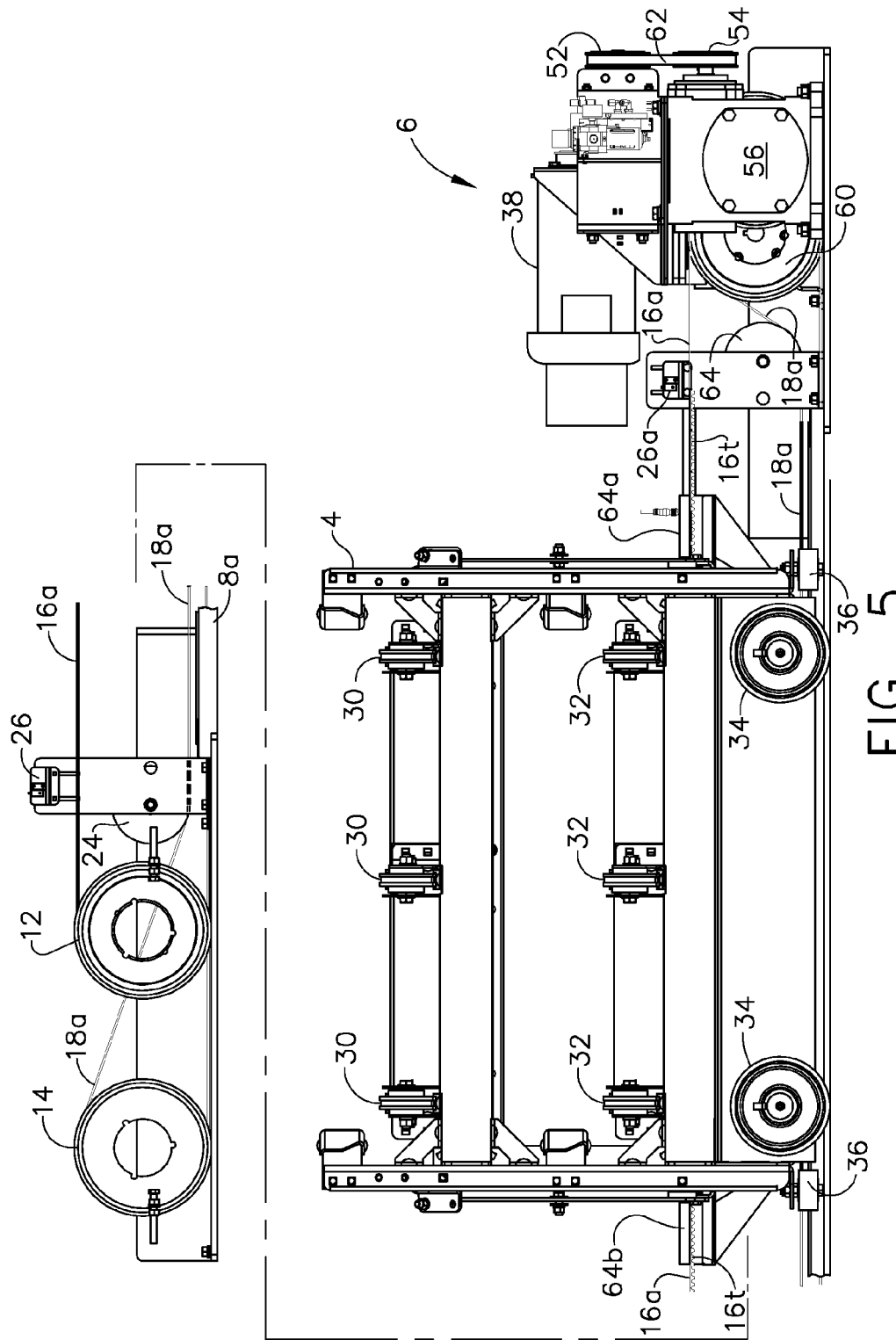
FIG. 5 is a front view of the shuttle, the remotely located mechanical power source and idler end of the mechanic power transmission system of the shuttle system of FIG. 1.
Figure 6:
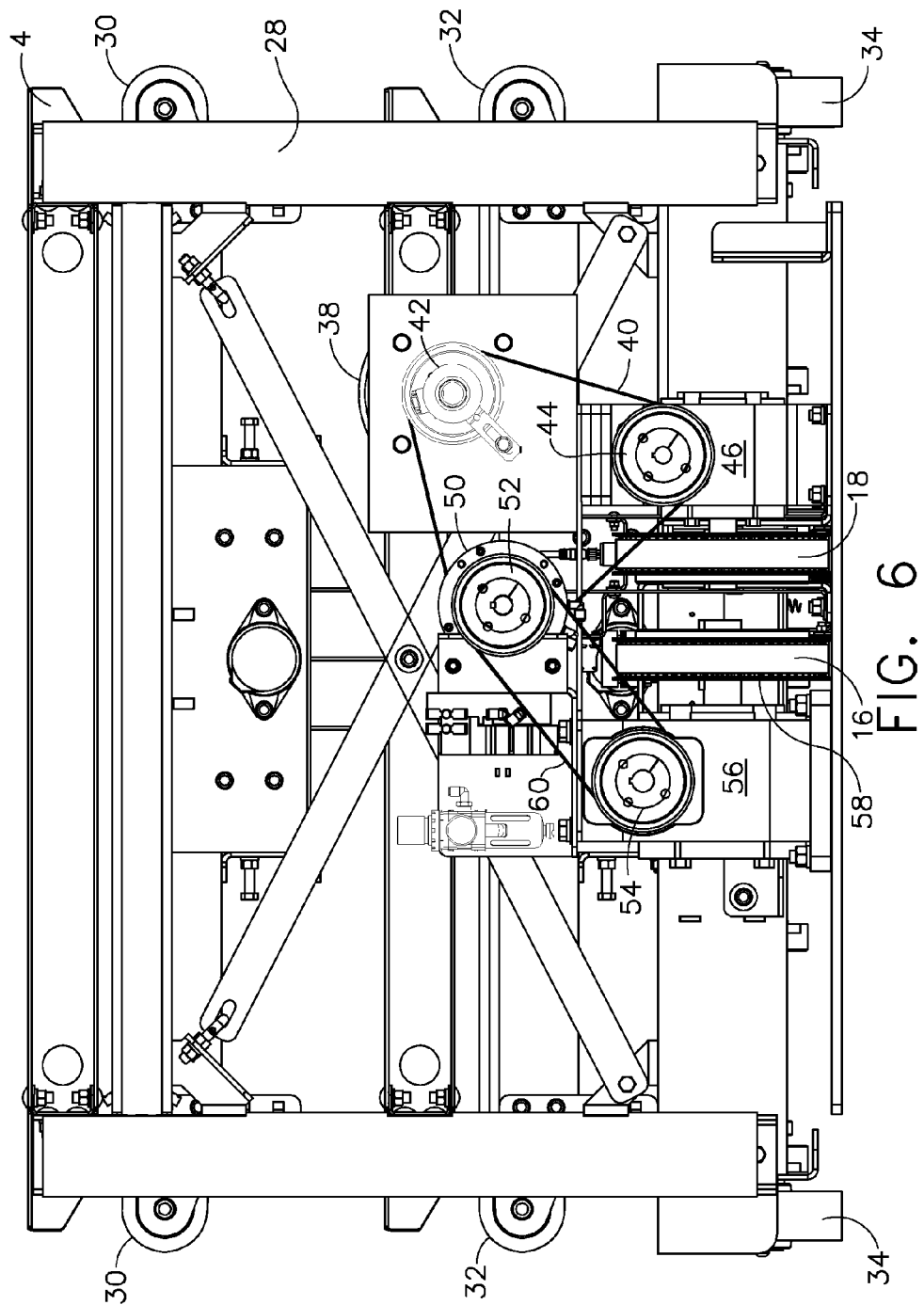
FIG. 6 is a right side view the shuttle and the remotely located mechanical power source of the shuttle system of FIG. 1.
Figure 7:
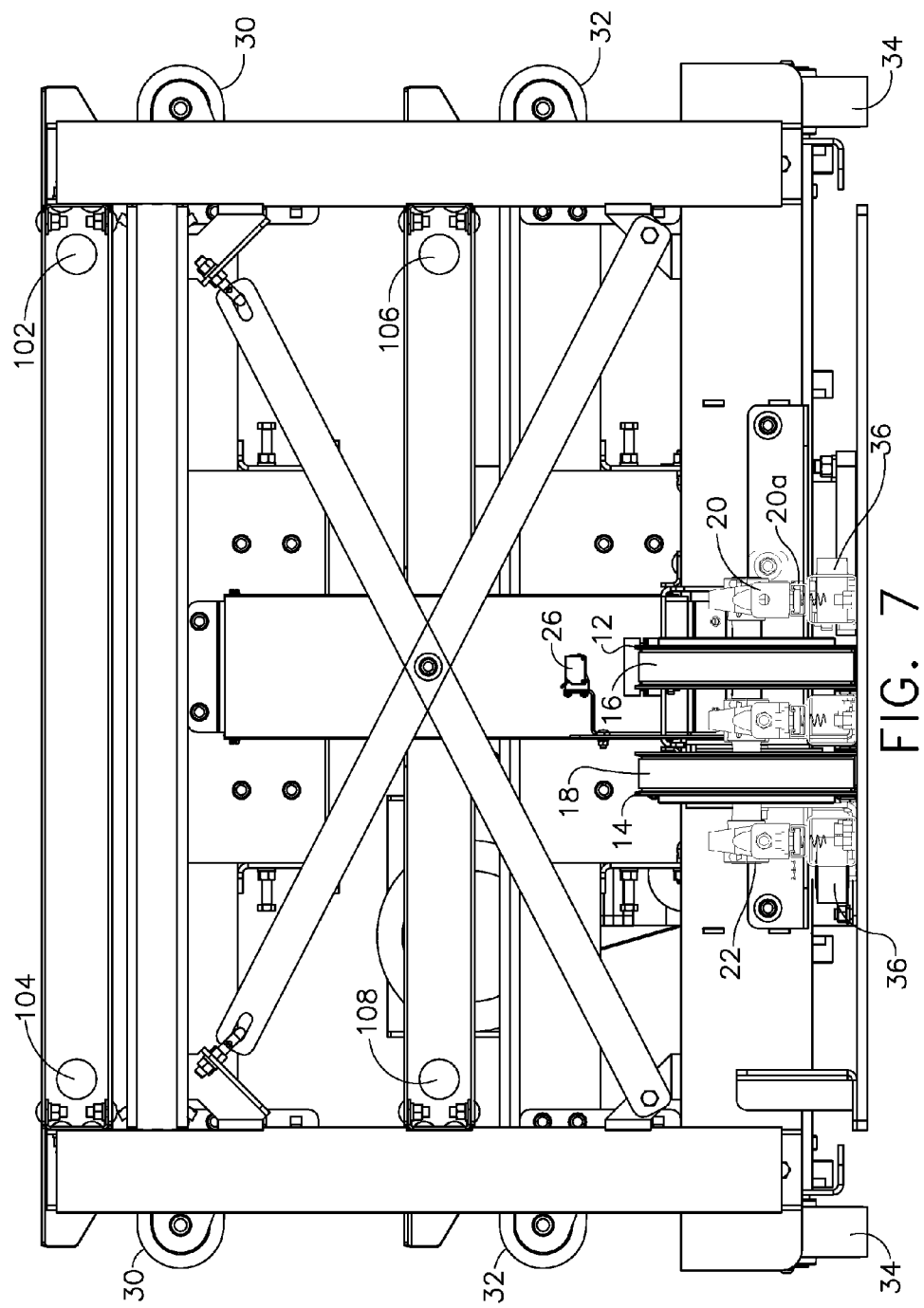
FIG. 7 is a left side view showing the shuttle and idler end of the mechanic power transmission system of the shuttle system of FIG. 1.

Proximity sensor 26*a* is seen in FIG. 5 overlying upper run 16*a* of shuttle drive belt 16, and functions the same as described above in reference to proximity sensor 26.

Figure 8:
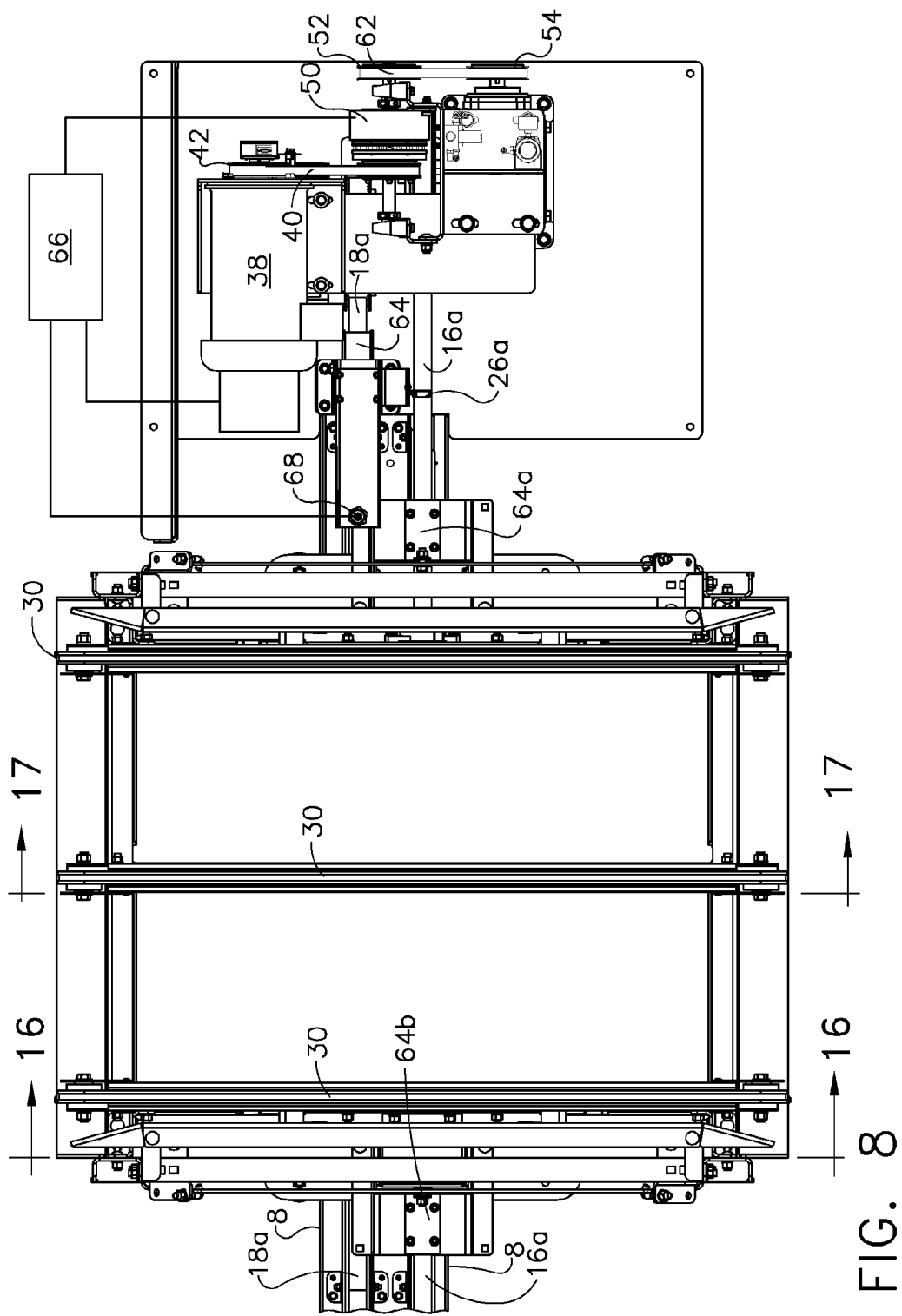
FIG. 8 is a top view of the shuttle and the remotely located mechanical power source of the shuttle system of FIG. 1.
Figure 9:
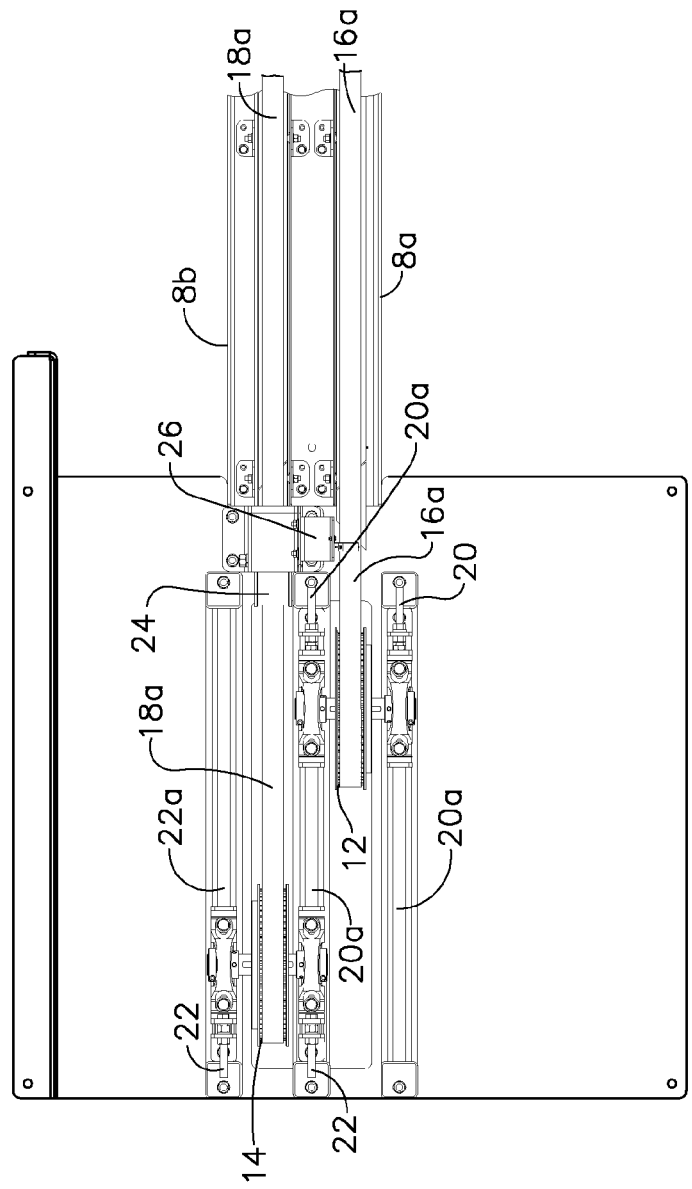
FIG. 9 is a top view of the idler end of the mechanic power transmission system of the shuttle system of FIG. 1.

In FIG. 8, controller 66 is diagrammatically shown in communication with mechanical power source 6, specifically connected to motor 38 and clutch/brake 50 to control them. Sensor 68 provides information to controller 66 indicative of when shuttle is at a predetermined location as sensed by sensor 68, such as the home position shown in FIG. 8, allowing controller 66 to match an exact known position (as sensed by sensor 68) with the position of shuttle based on sensing motion of shuttle drive belt 16, such as by rotation of pulley 58 or monitoring teeth of shuttle drive belt 16. Controller 66, which may have one or more processors, comprises at least part of a processing system which executes instructions to control shuttle system 2. In the embodiment depicted, logic for control of shuttle system 2 is resident on controller 66, which executes instructions that implement the control logic. Controller 66 may be dedicated to controlling shuttle system 2, or may also control other systems in addition to shuttle system 2.

Figure 10:
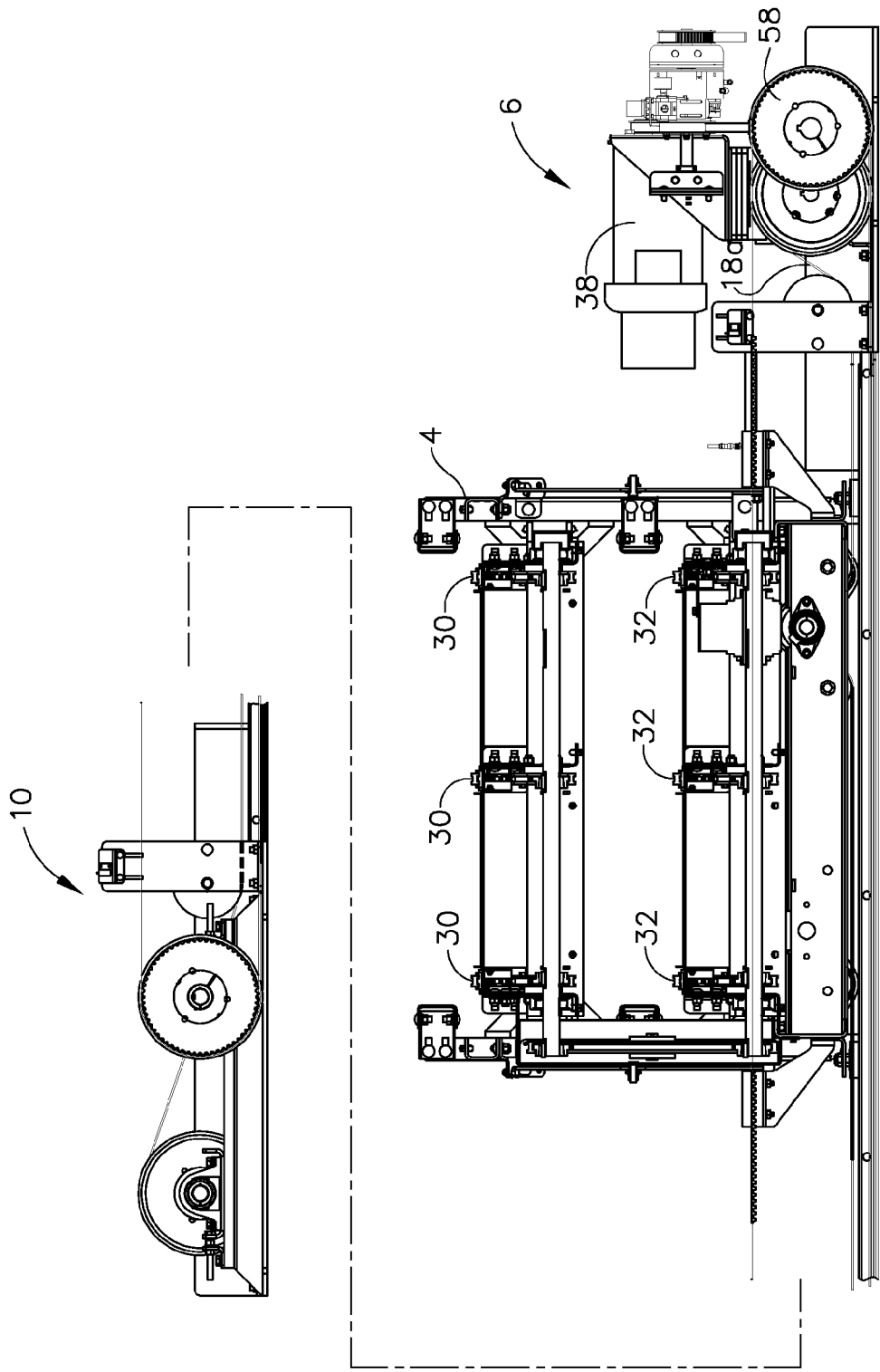
FIGS. 10, 11 and 12 are section views of the shuttle, the remotely located mechanical power source and idler end of the shuttle system of FIG. 1 taken at a plane through the shuttle drive belt.
Figure 11:
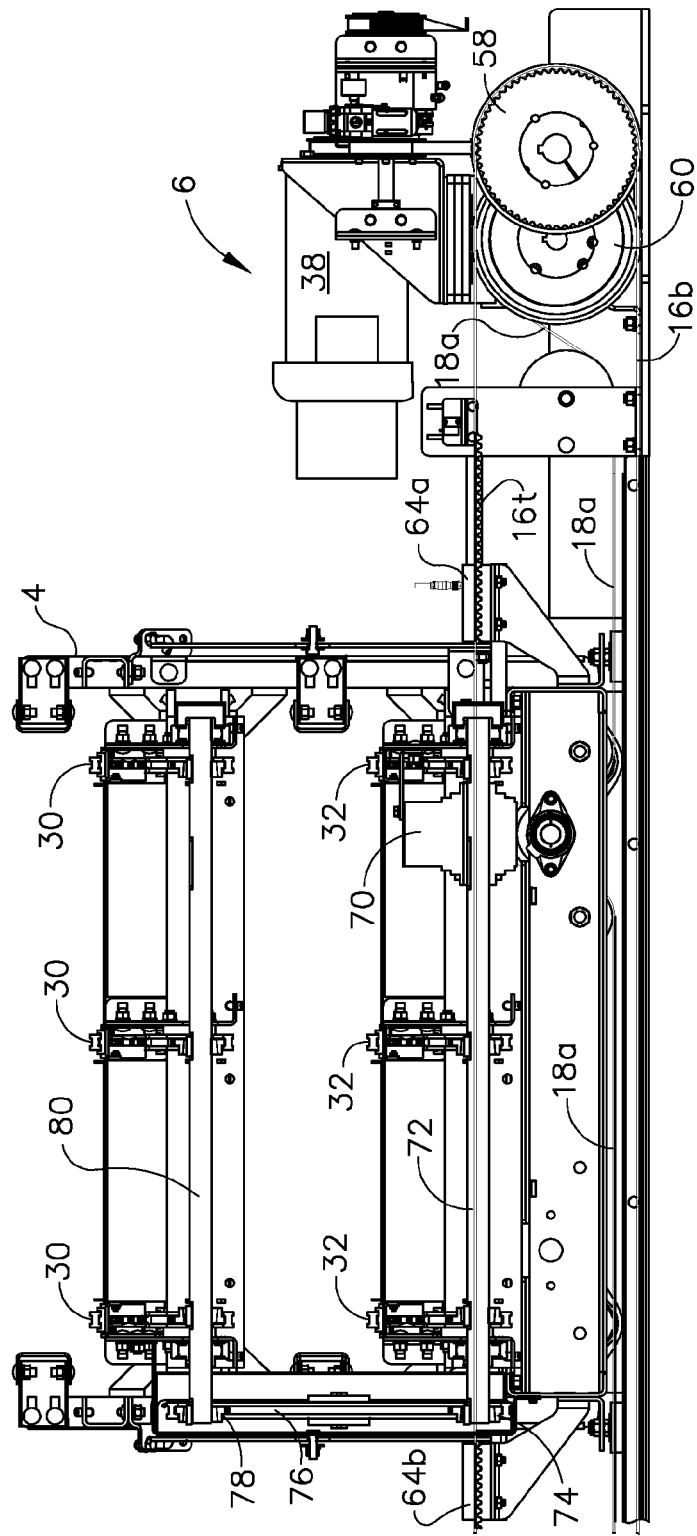
Figure 12:
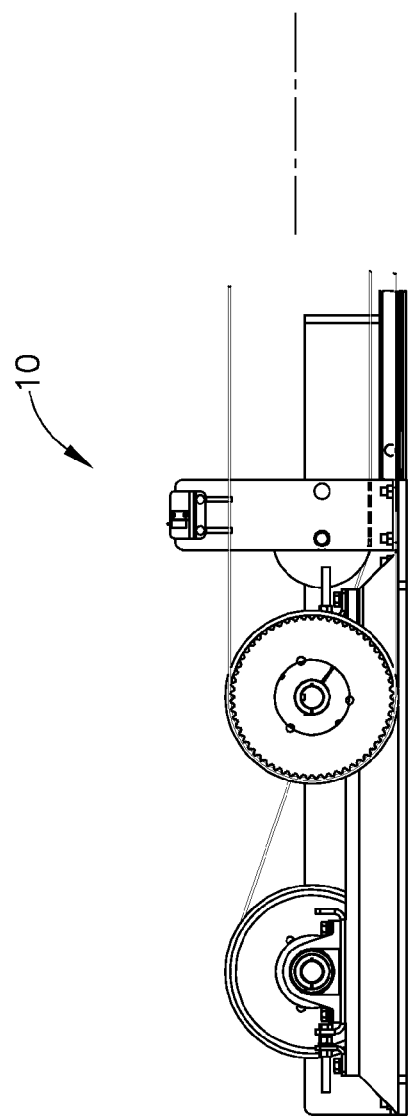

Referring to FIGS. 10-12, a sectional view through shuttle drive belt 16 is illustrated. Transfer transmission 70 can be seen, which drives rotatably supported lower conveyor drive shaft 72. Drive shaft 72 has sprocket 74 at its left end, which drives element 76, with element 76 driving sprocket 78. Upper conveyor drive shaft 80 is driven by sprocket 78.

Figure 13:
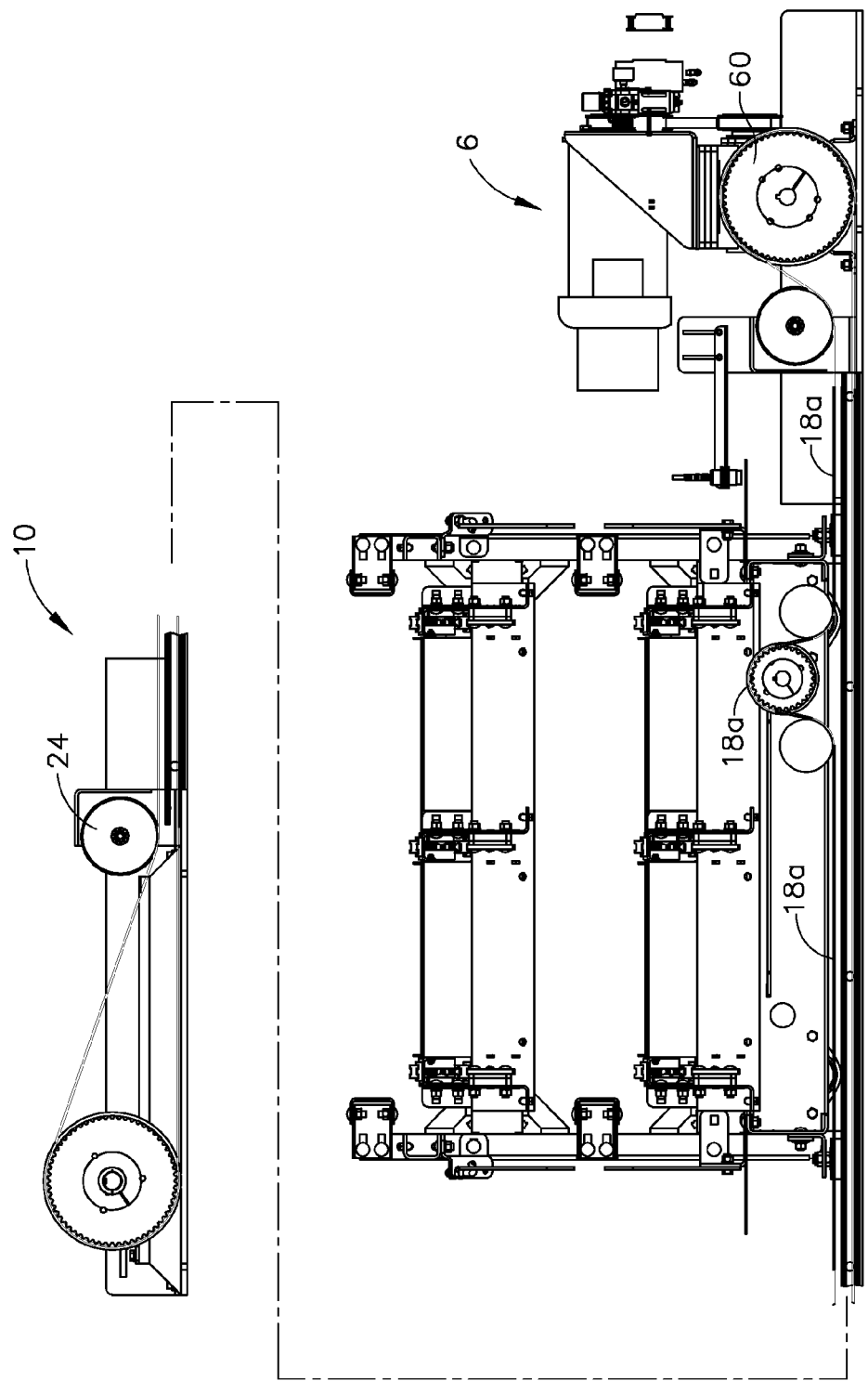
FIGS. 13, 14 and 15 are section views of the shuttle, the remotely located mechanical power source and idler end of the shuttle system of FIG. 1 taken at a plane through the transfer belt.
Figure 14:
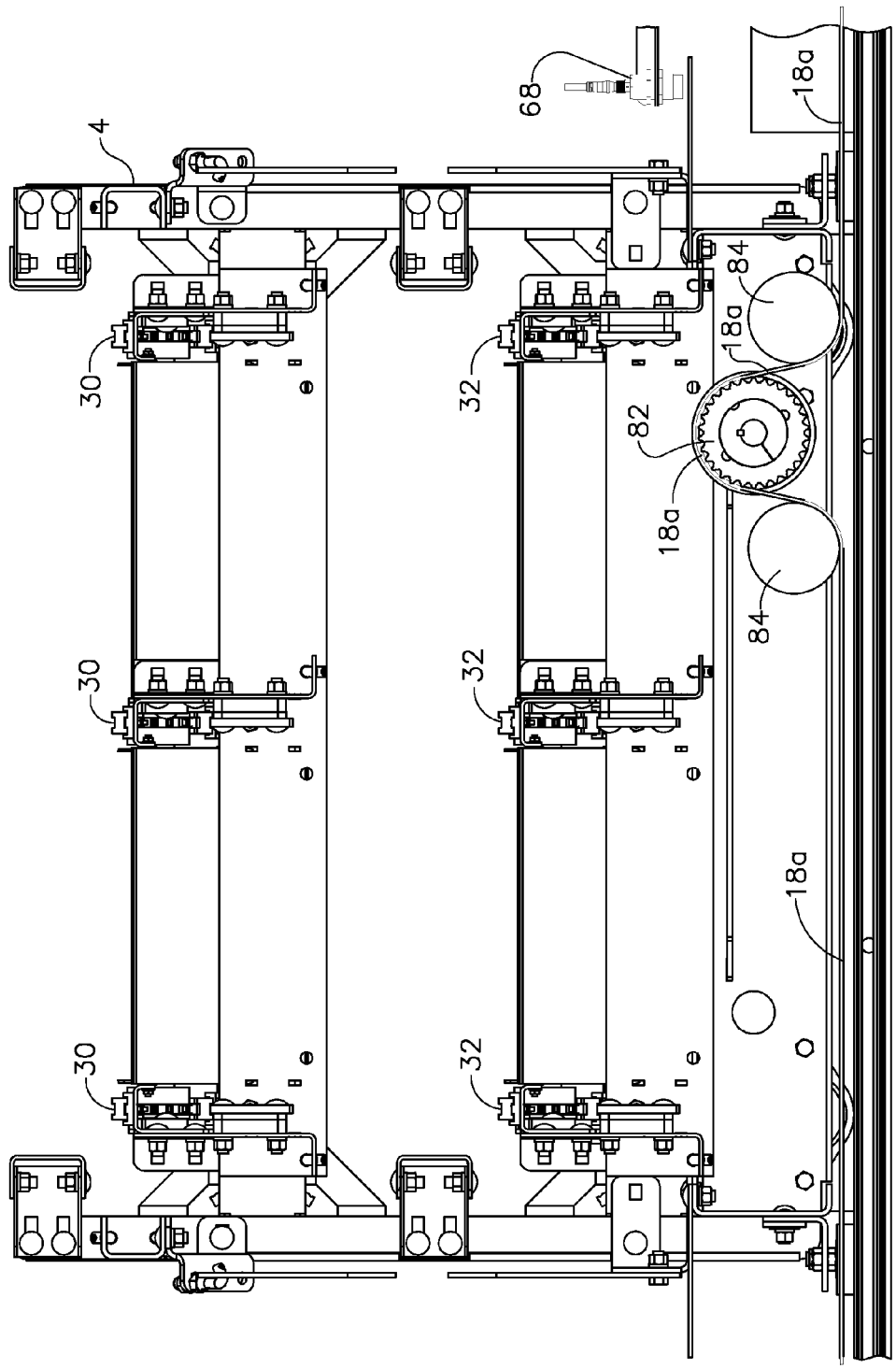
Figure 15:
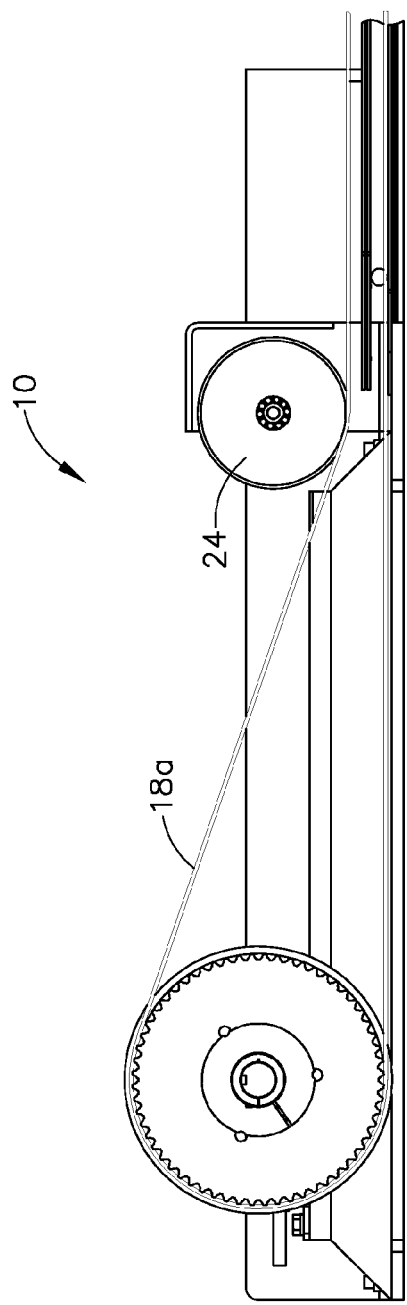

Referring to FIGS. 13-15, upper run 18*a* of transfer drive belt 18 is shown drivingly engaging pulley 82 which may be connected to the input of transfer transmission 70 through one or more intermediate shafts and gears or sprockets. Idlers 84 define a path for upper run 18*a* to ensure adequate engagement between transfer drive belt 18 and input pulley 82. Transfer drive belt 18 may include teeth extending from its interior surface, engaging complementarily exterior shaped teeth on input pulley 82 and transfer drive pulley 60. Relative motion between transfer drive belt 18 and shuttle 4 causes input pulley 82 to rotate, providing rotary motion to transfer transmission 70. The relative motion allows power from remotely located mechanical power source to be transmitted to transmission 70 through the flexible transfer drive belt 18. This causes upper and lower conveyor drive shafts 72 and 80 to rotate, driving upper conveyors 30 and lower conveyors 32 in a direction based on the direction of the relative motion between transfer drive belt 18 and shuttle 4.

Figure 16:
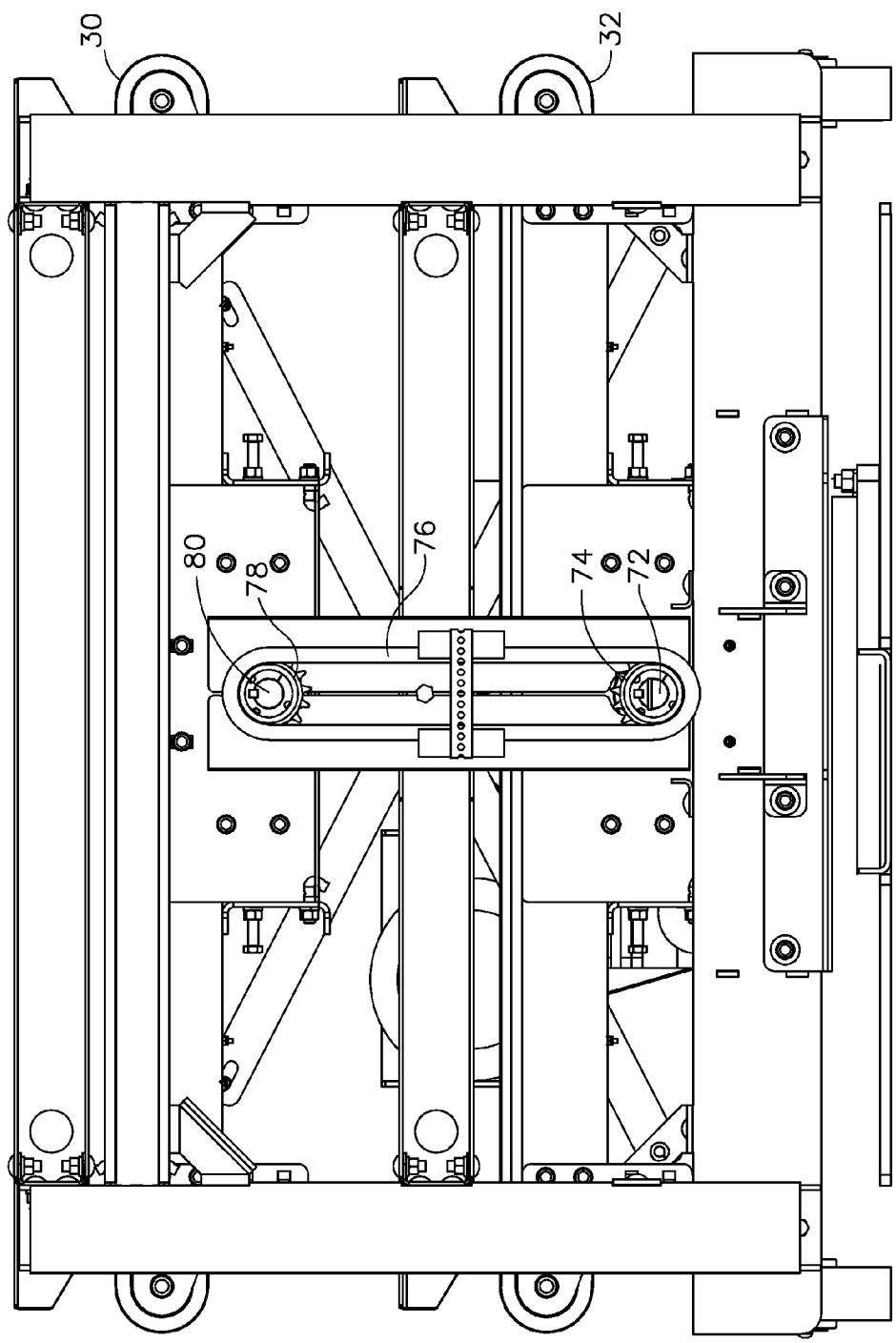
FIG. 16 is a section view taken at line 16-16 of FIG. 8 showing the drive arrangement for the transfer conveyors of the shuttle.
Figure 17:
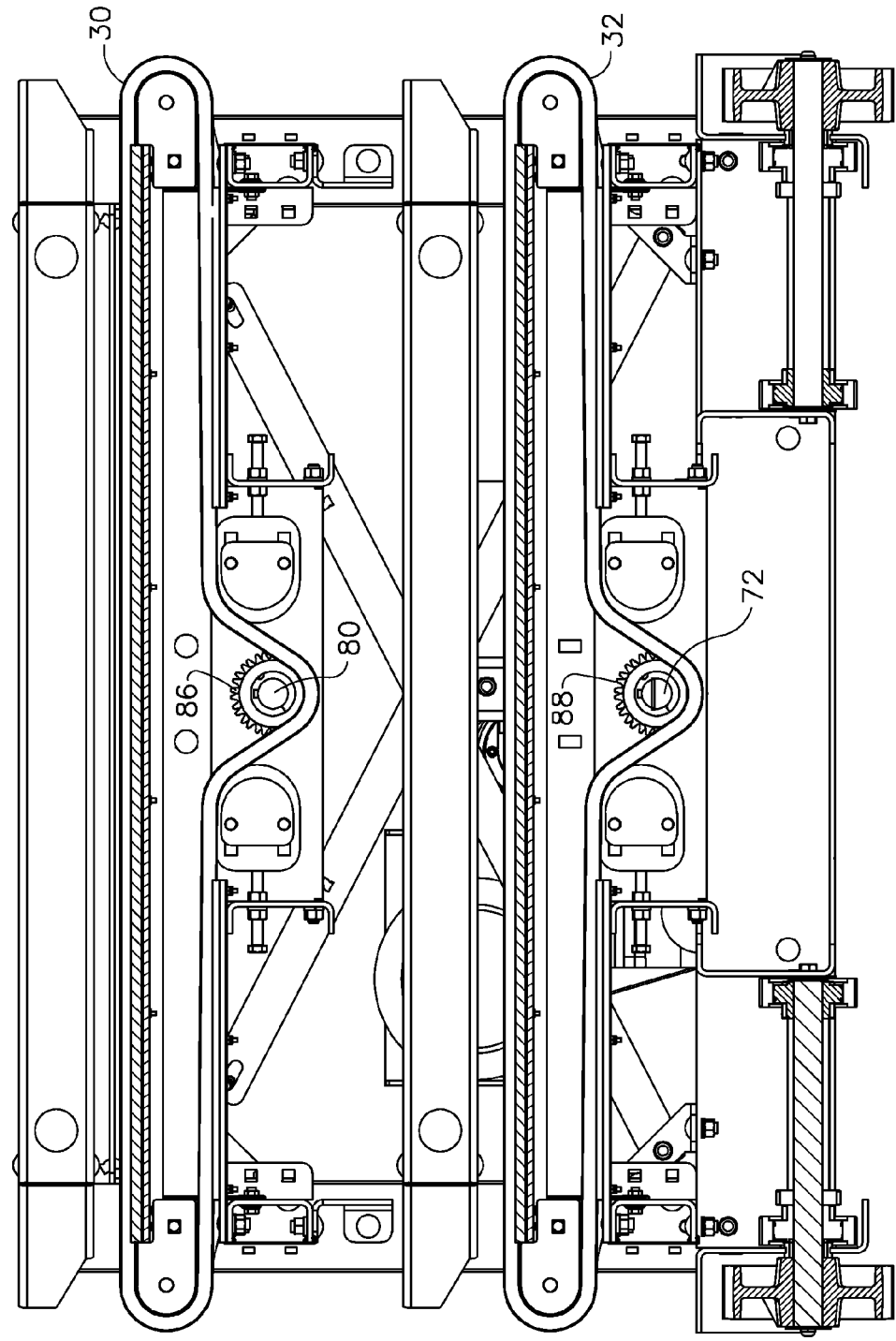
FIG. 17 is a section view taken at line 17-17 of FIG. 8 showing the drive arrangement for the transfer conveyors of the shuttle.

FIGS. 16 and 17 illustrate the transmission of motion from shaft 72, driven by transfer transmission 70, to upper conveyor drive shaft 80 and to upper and lower conveyors 30, 32. Each upper conveyor 30 engages a respective sprocket 86 driven by upper conveyor drive shaft 80. Each lower conveyor 32 engages a respective sprocket 88 driven by lower conveyor drive 72.

Referring to FIG. 1, shuttle 4 may be advanced from a home position 90 proximal assembly 6 to a first position 92 proximal a work station or conveyor diagrammatically illustrated at 92*a*, whereat an article, such as a pallet may be transferred to upper conveyors 30. In moving shuttle 4 to first position 92, controller 66 causes shuttle drive pulley 58 to drive shuttle drive belt 16 in the appropriate direction. Since shuttle drive belt 16 is flexible, shuttle 4 is pulled to the desired location by shuttle drive belt 16. From the previous explanation of mechanical power source 6, it will be noted that in when shuttle drive belt 16 is advanced, transfer drive belt 18 is also advanced in synchronized movement with shuttle drive belt 16, both at the same speed, and upper and lower conveyors 30, 32 do not move as there is no relative motion between transfer drive belt 18 and input pulley 82. When shuttle 4 reaches first position 92, which may be determined by tracking movement of shuttle drive belt 16 or by any suitable device, such as a laser range finder. Once shuttle is at first position 92, and upper and lower conveyors 30, 32 need to advance, it is necessary to create relative movement between transfer drive belt 18 and input pulley 82. To do this, shuttle drive belt 16 is disengaged from motor 38 via clutch/brake 50. It is also necessary to keep shuttle 4 from moving while transfer drive belt 18 is advanced. Clutch/brake 50 functions to keep shuttle drive pulley 60 from rotating, thereby causing shuttle drive belt 16 to maintain shuttle 4 in place. With shuttle drive belt 16 disengaged from motor 38, motor 38 may be driven in either rotational direction necessary to drive transfer drive belt 18 actuate and drive upper and lower conveyors 30, 38 to advance in the necessary direction, which in the present example is to receive an article, such as a pallet at first location 92. Anytime there is a speed difference between transfer drive belt 18 and shuttle drive belt 16, upper and lower conveyors 30, 32 will be actuated and move.

The movement of an article onto upper or lower conveyors 30, 32 may be sensed by sensors 94, aligned with opening 102, sensors 96, aligned with openings 104, sensors 98, aligned with openings 106, or sensors 100, aligned with openings 108. (See openings in FIG. 7) Sensors 94, 96, 98, 100 may be lasers or any suitable sensors. The location of sensors provide information to controller 66 of the articles position. For example, while loading an article from workstation 92a, sensors 94 would indicate an article was in the line between sensors 94. Once sensors 94 became unblocked, controller 66 would recognize that the article was on shuttle 4. If at the same time, sensors 96 became blocked, such would indicate that the article may have traveled too far. Alternatively, battery powered RF sensors may be used on shuttle 4 to transmit article position information wirelessly.

Once properly loaded, the brake of clutch/brake 50 may be disengaged and shuttle drive belt 16 engaged to drive shuttle 4 to second position 110, where the article may be automatically unloaded at work station 110a, utilizing the same coordination between the holding shuttle drive pulley 58 from rotating to keep shuttle 4 in place, while transfer drive belt 18 is advanced to unload the article. For the configuration of shuttle 4 illustrated, it is envisioned that full pallets would be transporting from one position on upper conveyors 30, discharging it at the other position, picking up empty pallets at that position and discharging them prior to picking up another full pallet.

Movement of shuttle 4 is not limited to two positions. Shuttle system 2 may have multiple locations at which shuttle 4 may be controlled to stop.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A material handling system comprising:
   a. a shuttle moveable between at least a first position and a second position, said shuttle comprising at least one conveyor;
   b. a remotely located mechanical power source, wherein said mechanical power source is not located on the shuttle;
   c. a first drive element connected to said shuttle, said first drive element configured to be selectively driven by said mechanical power source, said first drive element disposed to move said shuttle when said first drive element is driven by said mechanical power source;
   d. a second drive element configured to be driven by said mechanical power source, said second drive element configured to transmit power from said mechanical power source to said at least one conveyor when said second drive element is driven by said mechanical power source and there is relative motion between said second drive element and said shuttle, thereby actuating said at least one conveyor.

2. The material handling system of claim 1 wherein said first drive element is driven at a different speed than the speed at which said second drive element is driven, said at least one conveyor is actuated.

3. The material handling system of claim 1, wherein when said first drive element is driven at the same speed as the speed at which said second drive element is driven, said at least one conveyor is not actuated.

4. The material handling system of claim 1 comprising a controller in communication with said mechanical power source, wherein said controller comprises at least one processor that executes instructions to cause said mechanical power source to perform operations, said operations comprising preventing said first drive element from moving so as to maintain said shuttle stationary and causing said second drive element to move and actuate said at least one conveyor.

5. The material handling system of claim 4, wherein said operations comprise causing said first drive element and said second drive element to move at the same speed.

6. A method for controlling a material handling system, said material handling system comprising a shuttle moveable between at least a first position and a second position, said shuttle comprising at least one conveyor, a remotely located mechanical power source, a first drive element connected to said shuttle and configured to be driven by said mechanical power source, a second drive element configured to drive said at least one conveyor when there is relative motion between said second drive element and said shuttle, and to be driven by said mechanical power source, the method comprising driving said first drive element and said second drive element at the same speed so as to move said shuttle without actuating said at least one conveyor.

7. The method of claim 6, comprising actuating said at least one conveyor by driving said second drive element such that there is a speed difference between said second drive element and said first drive element.

8. The method of claim 7, comprising preventing said first drive element from moving.

9. A controller for controlling a material handling system, said material handling system comprising:
   a. a shuttle moveable between at least a first position and a second position, said shuttle comprising at least one conveyor;
   b. a remotely located mechanical power source;
   c. a first drive element connected to said shuttle and configured to be driven by said mechanical power source; and
   d. a second drive element configured to drive said at least one conveyor when there is relative motion between said second drive element and said shuttle, and to be driven by said mechanical power source;
   wherein the controller comprises at least one processor that executes instructions to cause said mechanical power source to perform operations, said operations comprising driving said first drive element and said second drive element at the same speed so as to move said shuttle without actuating said at least one conveyor.

10. The controller of claim 9, wherein said operations comprise actuating said at least one conveyor by driving said second drive element such that there is a speed difference between said second drive element and said first drive element.

11. The controller of claim 10, wherein said operations comprise preventing said first drive element from moving.

* * * * *